Feb. 7, 1961 H. A. PRICE 2,970,468
CELL FOR TESTING HYDROCARBON FUEL
Filed Dec. 27, 1956 2 Sheets-Sheet 1

INVENTOR
HAROLD A. PRICE
by Robert A. Finch
ATTORNEY

Feb. 7, 1961 H. A. PRICE 2,970,468
CELL FOR TESTING HYDROCARBON FUEL
Filed Dec. 27, 1956 2 Sheets-Sheet 2
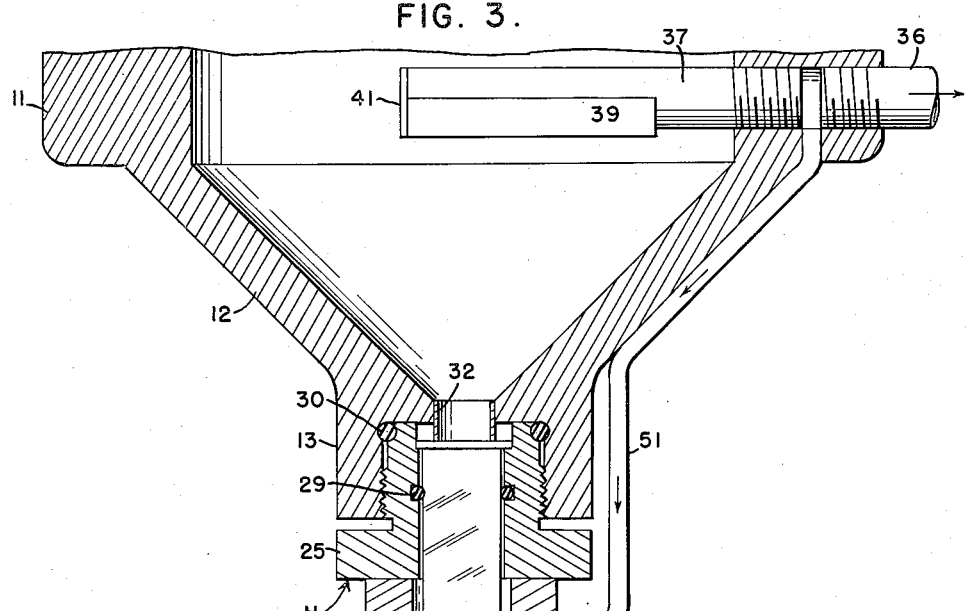
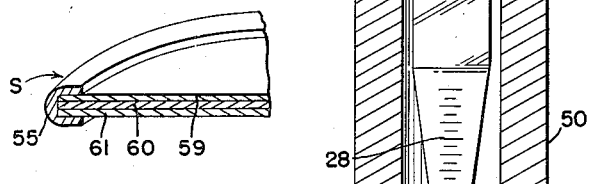
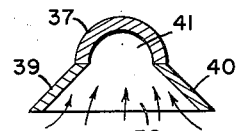
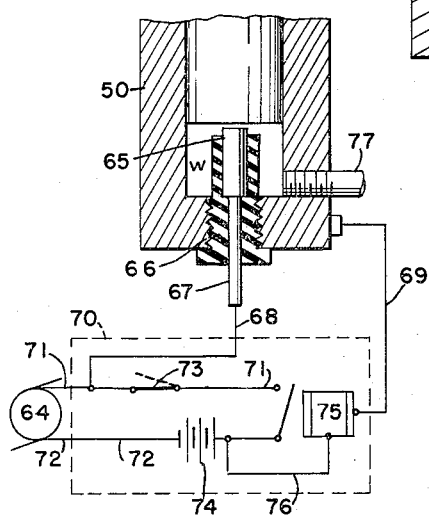
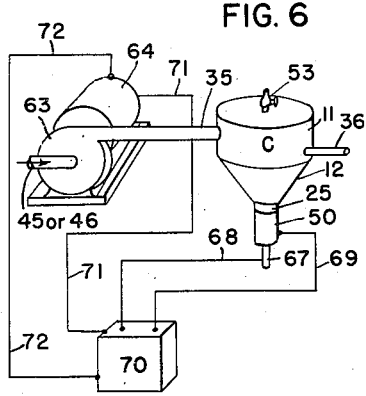
INVENTOR
HAROLD A. PRICE
by Robert R. Finch
ATTORNEY United States Patent Office 2,970,468
Patented Feb. 7, 1961

2,970,468
CELL FOR TESTING HYDROCARBON FUEL

Harold A. Price, Lafayette, Calif., assignor to Dorr-Oliver Incorporated, Stamford, Conn., a corporation of Delaware Filed Dec. 27, 1956, Ser. No. 630,841

14 Claims. (Cl. 73—53)

This invention relates to devices for indicating the presence in hydrocarbon fuels of contaminants therein, including entrained solids and water. The solids are usually in suspension in the fuel, such as gasoline, jet engine fuel, and diesel engine fuel, and they are referred to generally as dirt but including micronic solids, colloidal waxes and gums. The water is usually in discontinuous finely divided phase and often appears as an emulsion with the fuel. At any rate, the droplets of the water are so small as to be normally in permanent suspension and not ordinarily settleable. So this invention is directed to a hydrocarbon treating cell or unit that is portable and can be used by non-skilled operators for indicating readily and fairly accurately the presence and degree thereof of both liquid and solid contaminants in the hydrocarbon fuel in bulk plants, air bases, gasoline dispensing stations, and indeed, in the tanks of many individual vehicles, such as airplanes, guided missiles, trucks, tractors, automobiles, motor boats as well as larger vessels, and so on. More particularly, features of advantage of this invention include a water-coalescing filter unit capable of insuring clean water-free and dirt-free hydrocarbon fuel consumable by a land, sea, or air vehicle for its propulsion. Such a filter can also be used for spot checking to establish usability or nonusability of the fuel, since the filter unit, irrespective of the accuracy inherent in its operation, should indicate quickly and visually the quantity of water extracted from the fuel.

One object of the invention therefore is to devise a unit or cell that will treat a flow of fuel therethrough to entrap and retain from it and segregate one fraction of entrained solids, called generically dirt, and another fraction of entrained water. Another object is to devise such a unit small enough to be portable. Still another object is to devise such a basic unit that will operate effectively on fuel passing therethrough under low pressure, yet which with only slight modifications, will operate equally effectively on fuel passing therethrough at high pressures.

Yet another object is to devise such a basic unit that can be used to give an approximate measure of the dirt and of the water in the fuel, and can also be used to give a highly precise measure of the quantity of the dirt on the one hand and of the water on the other. A further object is to devise such a unit that will show visually the volumetric amount of the segregated water fraction.

A still further object is to devise such a unit that will permit the weight of the segregated dirt fraction to be easily determined. And another object is to devise such a unit that will operate on a proportioned small minor flow of the fuel bleed-off from the main flow, acting thereon as a fair average sample of the main flow, so that from the quantity of the segregated fractions of dirt and of water derived from the minor flow, the total amount thereof in the main flow can be quickly calculated.

These objects, as well as others that will appear hereinafter, can be realized by an embodiment of the invention wherein there is an enclosed casing having a covered cylindrical body portion and a depending hoppered portion with a replaceable liquid-permeable but dirt-catching septum extending transversely of the body portion while suitably supported to withstand downward pressure thereon. Means are provided for distributively feeding fuel into the body portion above the septum and there are means below the septum for collecting and flowing fuel from the body portion, as well as means connected to and depending axially from the hoppered portion for collecting water droplets settling thereinto from the hoppered portion. The septum includes means for entrapping entrained solids in the fuel on its upper surface and means for selectively treating fuel-entrained water particles passing through the septum to coalesce them into droplets large enough to be subject to gravity separation, whereby the dirt of the fuel is segregated on top of the septum and the water of the fuel is segregated in the water-collecting means extending from the hoppered portion, in which water-collecting means it is visually apparent and measurable.

There are other details of construction and arrangement of parts that are hereinafter more precisely identified.

The invention is illustrated in the accompanying drawings, in which:

Figure 3 is a view similar to Figure 2 of a modification of the device for use when the fuel being tested is under higher pressures.

Figure 4 is a vertical cross-sectional view through the fuel-collecting discharge pipe.

Figure 5 is a partial isometric view of one of the dirt-catching and water-coalescing septa used in the device.

Figure 6 is a more or less schematic diagram of an automatic sensing and flow control unit useful in combination with the invention.

Figure 7 is a diagrammatic view showing further details of a portion of the system shown in Figure 6.

Figures 1, 2:
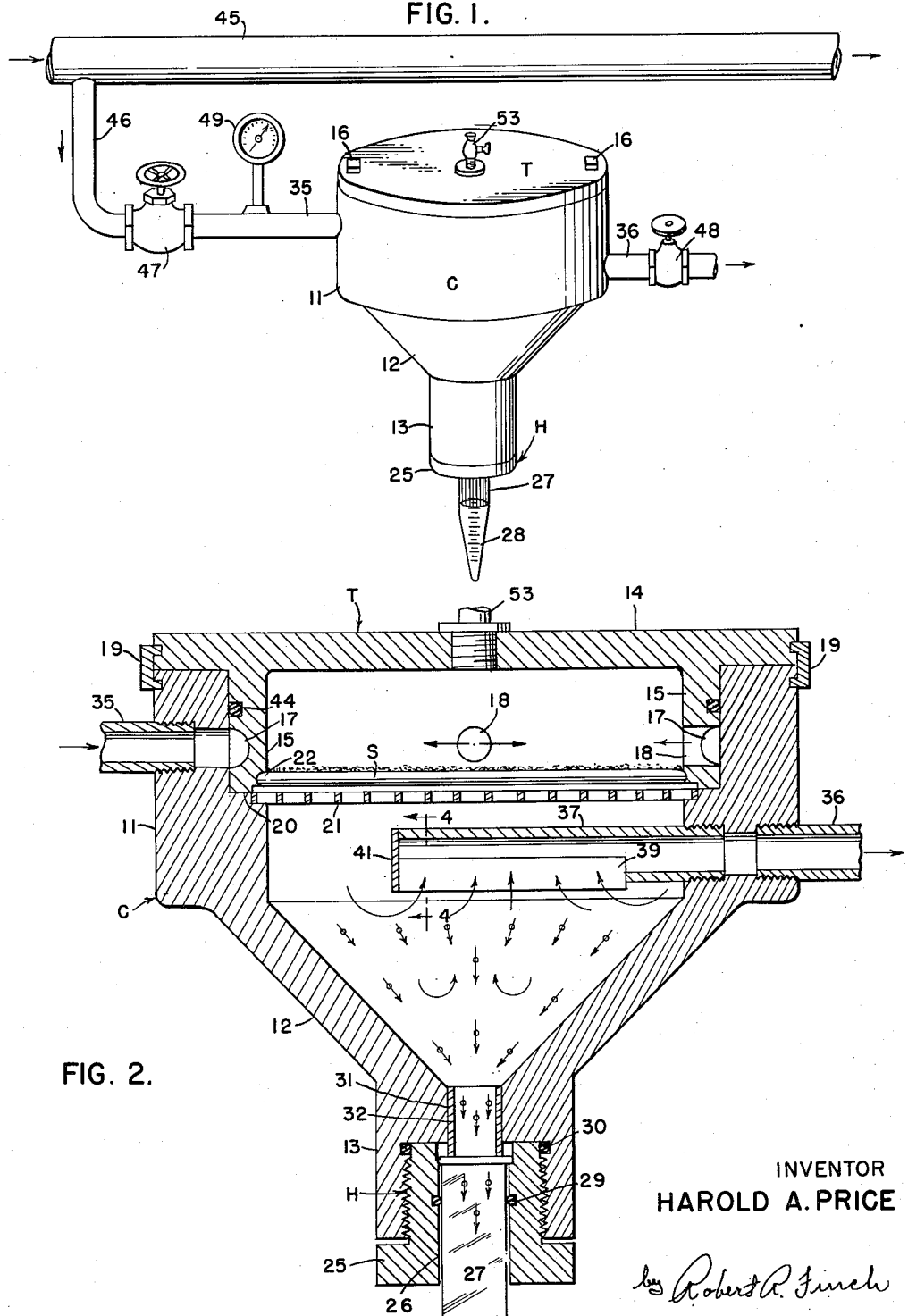
Figure 1 is an isometric view of an embodiment of the invention in an environment showing one of its uses.
Figure 2 is a vertical sectional view of the device of Figure 1, with the bottom part broken off to save space.

In the drawings, the device comprises an enclosed casing C having a cylindrical body portion 11 from which depends a hollow coned or hoppered portion 12, terminating in a smaller hollow cylindrical bottom portion 13. The body portion is closed by a top or cap piece T made up of a plate 14 with an annular depending flange 15 fitting inside the body portion 11 and held therein on seat 20 by means of bolts 16 (shown in Fig. 1), or by some usual tight-fitting but quick-releasing sealing coupling, such for instance as the clampable band 19 that is C-shaped in cross-section (shown in Fig. 2). The exterior periphery of the flange 15 is channeled as at 17 and connected with this channel are a plurality of radial openings 18. Just below the seat 20, is a transversely extending foraminous screen or grid 21 adapted to support against downward pressure a septum or pad S, clamped in place on the screen or grid 21 between an annular jaw 22 on the flange 15 and the seat 20 on the cylindrical body portion 11. The annular bottom portion 13 is closed by screw-threaded tube holder H having a plug 25 provided with a bore 26 through which extends a transparent tube 27, such as a test-tube or centrifuge-tube, provided with gradations 28 (Fig. 1). The tube 27 can be replaceably held in the bore 26 of the plug 25, such as by O-ring 29. The plug is fitted into the bottom portion 13 and made tight therein against leakage by O-ring 30. The bore 31 in the bottom portion 13 may be lined such as by the ferrule 32. Fuel to be treated is supplied through feed pipe 35, leading the fuel into the annular channel 17. Fuel after being treated leaves the cell or unit through outlet pipe 36, valved as at 48, through an aligned pipe continuation 37 thereof having in its under-side a slot 38, into which fuel is led by a hood formed by wings 39 and 40. The other end of the pipe 37 is closed as at 41. 44 indicates an O-ring for making leak-tight the juncture between the annular flange 15 on the top portion T and the body portion 11. In Fig. 1, 45 indicates a main conduit through which fuel is flowing, while 46 indicates a bleed-off pipe for taking from the main conduit a minor flow of its fuel and the proportion of this minor flow can be carefully predetermined. Pipe 46 is valved as at 47, and at 49 it has a velocity indicator for showing the velocity of the pressured fuel flowing into the test cell or unit C through feed pipe 35 from the main conduit 45. Fig. 3 shows an additive feature for use when the cell is being used on fuel under higher pressures. In this case, the tube 27 must be protected by a casing 50, and the space between the tube and the casing must have its pressure equalized with that in the discharge pipe 36, so to that end, there is an equalizing pipe 51 leading from the discharge pipe to the interior of the casing 50. 52 is a pressure-relieving pet-cock depending from the casing 50 and 53 is an air-releasing pet-cock rising from the cap piece T.

The sloping inner walls of the coned portion 12 must be at an angle greater than the angle of repose of water droplets settling thereon and preferably it should be polished and even treated to be made hydrophobic.

Now we come to the dirt-collecting and water-coalescing blanket-like or pad-like septum S: as can be seen from Fig. 5, the septum comprises a marginal binding 55, for example, of water-glass, for holding in face-to-face contact three superposed water-permeable sheets or layers, 59, 60, and 61. Layer or sheet 59 is preferably made up of non-wettable or non-water-absorbent fibers, such as glass fibers, with tiny interstices between the fibers of the sheet. The middle layer or sheet 60 is also made of non-wettable fibers, much as is the superjacent layer 59, except that the interstices of this layer are incrementally larger than the interstices in the superjacent layer. In other words, the size of the intersticial passageways through the middle layer 60 will permit to pass therethrough droplets of larger size than pass through the intersticial passageways of the top layer 59. The bottom layer 61 is entirely different in that it is a hydrophilic layer or sheet made of fibers that are preferably water-absorbent themselves. The sheet need have no significant thickness or depth but must be porous to the extent that the sheet is water-permeable. The sheet can be of cotton linter or hemp fibers, by way of illustration. Although other filter and coalescing media can be employed with the invention, the above described septum with its particular sequence of layers is to be preferred since it is especially effective in coalescing water from mixtures having low interfacial tension, below say about 20 dynes per centimeter and of course also will coalesce mixtures of high inter-facial tension.

Now as to the functioning of this water-coalescing septum: the theory of its operation is highly controversial although its capability of coalescence has been convincingly demonstrated. One presumed explanation of operation is that due to the pressured feed to the test cell or unit, the discontinuous tiny particles of water above the septum, tend to crowd through the intersticial openings in the now-wettable top layer 59, and the pressure on them causes them to make droplet-merging formations above the interstices while continued pressure in forcing a plurality of the tiny particles through the interstices coalesces them into droplets. These coalesced droplets then crowd around the incrementally larger interstices in the subjacent non-wettable layer 60, whereupon continued pressure on them causes them to merge or coalesce into larger droplets. But, in the septum illustrated, this progressive or incremental enlarging of the droplets stops there in so far as interstices are concerned. The next step is to force the larger droplets against the upper surface of the water-absorbent subjacent layer or sheet 61, whereupon by capillary attraction and absorption, the droplets lose their spherical form and change into the form of a film that depends from the under side of the lowermost layer 61. More droplets collecting on the water-absorbent layer 61 cause this film to grow until it increases in area incrementally until gravity can come into operation, whereupon each film drops from the under side of the bottom layer 61 and takes the form of a much larger drop. This drop is then found to be large enough to be amenable to Stokes' law and is thus settleable in the lighter specific gravity fuel oil in which it finds itself. The fuel to be treated in the test cell must be fed at such a velocity head that when it encounters the septum, the velocity of the fuel will not exceed the droplet-forming capability of the interstices of the top layer. Going back now to Fig. 2, the simple arrows represent oil, whereas the circle-bearing arrows indicate settleable drops of water. The material of the layers of the septum S are preferably of such a nature that they can be heat-dried to a constant weight at temperatures below the decomposition temperature of either the collected solids or the septum. Thus, after a period of operation, the septum is removed and dried to determine the dry weight of the septum with its dirt load. Since the dry weight of the septum alone is usually indicated thereon when it is purchased, the weight of collected dirt is simply obtained by the weight difference.

As shown in Figures 6 and 7, the device may be supplemented by equipment which, upon the accumulation of any significant quantity of coalesced water in the unit, automatically stops the pump that is forcing the fuel to flow to and through the testing unit. Fig. 6 shows the testing unit or cell C hooked up to receive the fuel through its infeed pipe 35 through which the fuel is forced by pump 63, driven by motor 64 from fuel conveying main line 45 or branch line 46.

For such special use, the inner liquid collecting tube 27 is dispensed with and coalesced water is collected in an explosion-proof casing 50 in which is positioned an electric probe or electrode 65 that is insulated except at its upper end while its lower end passes into a removable insulated plug 66 in the wall of casing 50 and terminates in a stem 67 with which is connected a wire 68 while a ground wide 69 is connected to the casing 50. These two wires go to a box 70 from which lead wires 71 and 72 forming a circuit with the motor 64 that drives the pump 65. Within the box 70 is an electrical circuit arrangement indicated diagrammatically in Fig. 7, wherein in the motor circuit there is a switch 73 and a source of power 74 as well as a solenoid-switch or relay 75 in circuit with wire 69 and a branch wire 76. 77 indicates a pipe that is suitably valved for draining water W from casing 50 when desired.

In operation hydrocarbon fuel from which contaminants are to be removed is pressure-fed to the casing C through feed pipe 35. The fuel flows around the channels 17 and then radially inwardly through openings 18 to keep filled the space above the septum S. Pressure on the fuel causes its liquid components to pass downwardly through the septum leaving on its top what solid contaminants there are in the fuel. In being forced downwardly through the layer-bearing pad-like septum, the hydrocarbon fuel itself remains untreated but the water contaminant entrained therein becomes coalesced, as previously described, whereupon there is emitted from the under side of the pad-like septum supported against the feed pressure by the grid or screen 21, a mixture of fuel particles and of water particles in the form of droplets that are large enough to be effected by gravity and caused to settle since they have a higher specific gravity than the fuel particles. The fuel particles are shown by clean-shafted arrows while the water particles are shown by the arrows having a small circle on their shafts. The water particles settle in the hoppered bottom 12 of the casing and pass downwardly through the bore 31 (and its ferrule-like lining 32) to collect in the graduated transparent tube 27, there to be measured. Meanwhile, the uncontaminated fuel particles rise into the hood formed by the wings 39 and 40 and thence into the pipe 37 that leads them into and through the fuel outlet pipe 36. After a certain volume of fuel has passed through the casing C, flow thereto can be shut off by valve 47; and the parts disassembled to remove the septum with solids thereon which can then be dried to determine the weight of solids so entrapped.

Disassembly of the casing can be done readily by removing the top or cap piece T which exposes the septum so that it can be lifted off its grid support 21, and removed to be dried to determine the amount of solids extracted from the fuel by the septum S. The graduated tube 27 can also be readily removed by merely unscrewing the tube holder H through the medium of its plug 25. The cap piece T can be held in place by bolts, such as 16, or it can be held in place by a quick releasing band-type coupling 19.

In starting up, it is desirable to have no air trapped within the casing or cell C, so the pet-cock 53 is opened during the initial flow-through the cell whereupon it is closed. The valve 47 is controlled with respect to the gauge or flow-meter 49 to use an infeed pressure on the fuel that lends itself to good water-coalescing by the septum S. If the feed pressure used is of a high order, then the water-collecting tube 27 must be protected by the casing 50, and pressure between the inside and outside of the tube should perhaps be equalized by means of the equalizing pipe 51 leading from the outlet pipe 36. Valve 48 on the latter pipe has to be closed to prevent backflow of fuel to the casing C from the fuel line 45, when disassembling the casing, in starting it up, and in stopping it. Pet-cock 52 in the casing protecting the water-collecting tube 27, makes possible the relief of pressure therein when disassembling the casing, or in removing the tube. The casing or cell can be used for the extraction of solid and liquid contaminants from fuel either by treating only a minor flow thereof drawing from a major flow as shown in Fig. 1, or it can be used to treat the entire flow, if desired, for the principles of functioning remain the same irrespective of volume of flow treated. Also, the cell can be used while stationary with the fuel brought to it; or it can be mounted on a fuel-propelled vehicle and treat the fuel of the vehicle while the vehicle is in motion.

Although the invention has been described with particular reference to instances in which the feed liquid contains water to be coalesced and separated, it is to be understood that it may be employed as a pressure filter to take rapid readings of solids content alone. Also, the device may be employed on feed material such as waste water to measure its oil content. In such a case, the unit will be mounted in an inverted position with the graduated collection tube upward and a suitable oil coalescing septum, such as a cellulose fiber material, employed. Operated in such a manner, coalesced oil will rise into the graduated cylinder to be measured. For convenience of operation in oil coalescing, the graduated cylinder should be provided with a pet-cock similar to 53 for releasing entrapped gas on start-up.

In the supplemental arrangement of Figs. 6 and 7, when enough coalesced water W collects in the bottom of the dependent casing 50 sufficiently to cover the non-insulated upper end of electric probe 65, the water between the probe 65 and the casing 50 completes the electrical circuit through wires 68 and 69 which, in turn, motivates relay or solenoid-switch 75 to break the motor circuit 71 and 72, whereupon the motor 64 is forthwith stopped and so is pump 63 driven thereby. By this arrangement, the unit or cell C will function automatically upon the collection of coalesced water therein to stop further pumping of fuel in either or both of fuel feed lines 45 and 46. The operation of the motor and its driven pump can be restored readily after draining water W from the casing 50 through pipe 77. This arrangement can also be connected to a direct reading system to indicate automatically when a predetermined quantity of water has been collected and by correlating such quantity to the quantity of fuel passed through the test unit, a direct reading of fuel purity can be obtained.

As this invention may be embodied in several forms without departing from the spirit or essential characteristics thereof, the present embodiment is therefore illustrative and not restrictive, since the scope of the invention is defined by the appended claims and all changes that fall within the metes and bounds of the claims or that forming their functional as well as conjointly cooperative equivalents, are therefore intended to be embraced by those claims.

I claim:

1. A device for indicating the quantity of entrained solids and of water in a hydrocarbon fuel, which comprises an enclosed generally funnel-shaped casing having a covered cylindrical body portion and a depending hoppered portion, a liquid-permeable septum extending transversely of the body portion, a foraminated support therefor, means for distributively feeding fuel into the body portion above the septum, a downwardly opening hood means below the septum for collecting and flowing fuel from the body portion, and means extending axially from the hoppered portion for collecting water droplets settling thereinto from the hoppered portion, said septum including means for entrapping on its upper surface fuel-entrained solids, and means for selectively treating fuel-entrained water particles passing through the septum with the fuel to coalesce them into droplets large enough to be subject to gravity separation, whereby the dirt of the fuel is segregated on top of the septum and the water of the fuel is segregated in the water-collecting means extending from the hoppered portion.

2. A device according to claim 1, wherein the hoppered portion has its sides slanted at an angle greater than the angle of repose of the settling coalesced water droplets.

3. A device according to claim 1, wherein the water-collecting means comprises a graduated tube of transparent material.

4. A device according to claim 1, with the addition of a protective casing for the water-collecting means depending from the device, and conduit means extending from the feed means to equalize the pressure between the water-collecting means and its casing with that of the discharging fuel.

5. A device according to claim 1, with the addition that the hood means below the septum for collecting and flowing fuel from the body portion comprises a pipe closed at one end and having a downwardly directed slot in at least a portion of its length with wings extending generally laterally and downwardly from the slot for collecting fuel upwardly rising thereinto.

6. A device according to claim 1, with the addition of means forming an annular channel within the peripheral wall of the body portion to which channel the feed means is connected, and a plurality of radially extending outlets leading from the channel into the interior of the body portion of the device for distributively supplying the fuel into the body portion above the septum.

7. A device according to claim 1, with means for regulating the rate of inflow of the fuel into the body portion to be slow enough so that its velocity head will not exceed the shearing force of the interstices in the septum that makes it liquid-permeable.

8. A device according to claim 1, wherein the septum comprises a multi-layered disc-shaped pad having at least two superposed layers of intersticed sheets of non-wettable material and a bottom layer of a sheet of water-absorbent material.

9. A device according to claim 8, wherein the marginal edges of the pad are bound together to prevent relative displacement of its layers, and means are provided in the body portion of the device for clamping the pad to hold it in place upon its foraminated support.

10. A device according to claim 8, wherein the interstices in the superjacent layer of the two layers are smaller than those in the subjacent layer.

11. A device according to claim 8, wherein the material of the layers is heatable without destruction to dry it so the weight of the solids segregated thereon can be measured by before and after weighing.

12. A device for indicating the quantity of entrained solids and of water in a hydrocarbon fuel, which comprises an enclosed generally funnel-shaped casing having a covered cylindrical body portion and a depending hoppered portion, a liquid-permeable water-coalescing septum extending transversely of the body portion, a foraminated support therefor, means for distributively feeding fuel into the body portion above the septum, means below the septum for collecting and flowing fuel from the body portion, means extending axially from the hoppered portion for collecting water droplets settling thereinto, a motor, a pump driven by the motor for pumping such fuel to its place of use, switch means for starting and stopping the motor, electric probe means extending into the water collecting means, electrically operable actuating means for the motor switch, a power circuit including said probe means and said electrically operable means, which circuit is normally open with said switch means closed and the motor driving the pump, said circuit adapted to be closed through said probe means by a predetermined amount of water accumulated in said collecting means to cause said electrically operable means to stop the motor and the pump.

13. A device for indicating the quantity of entrained solids and oil in a liquid feed, which comprises an inverted enclosed generally funnel-shaped casing having a covered cylindrical body portion and an upwardly extending hoppered portion, a liquid-permeable septum extending transversely of the body portion, a foraminated support therefor, means for distributively feeding liquid into the body portion below the septum, an upwardly opening hood means above the septum for collecting and flowing liquid from the body portion, and means extending axially upwardly from the hoppered portion for collecting oil droplets rising thereinto from the hoppered portion, said septum including means for entrapping on its lower surface entrained solids, and means for selectively treating entrained oil particles passing through the septum with the liquid to coalesce them into droplets large enough to be subject to separation by flotation, whereby the dirt of the liquid is segregated on the septum and the oil is segregated in the oil-collecting means extending upwardly from the hoppered portion.

14. A device for indicating the quantity of entrained solids and a discontinuous phase in water and oil suspensions having both oil and water as constituents thereof and in which one of said constituents exists in a continuous phase and the other of said constituents exists in a discontinuous phase, which comprises an enclosed generally funnel-shaped casing having a covered cylindrical body portion extending co-axially from the base of said funnel-shaped casing, a liquid-permeable septum extending traversely of the body portion, a foraminated support therefor, means for distributively feeding said suspension into the body portion on one side of the septum, means within said casing on the other side of the septum for collecting and discharging said continuous phase and means extending axially outwardly from said casing for collecting said discontinuous phase, said septum including means for entrapping on its said one surface entrained solids, and means for selectively treating said discontinuous phase passing through said septum with said continuous phase to coalesce said discontinuous phase into droplets large enough to be separated from said continuous phase, whereby solids are segregated on said septum and said discontinuous phase is segregated in said means axially outwardly extending from said casing.

References Cited in the file of this patent

UNITED STATES PATENTS

| 1,632,458 | Thatcher | June 14, 1927 |
| 2,742,156 | Spangler | Apr. 17, 1956 |
| 2,766,890 | Kasten | Oct. 16, 1956 |
| 2,767,848 | Beckett | Oct. 23, 1956 |
| 2,883,345 | Taylor et al. | Apr. 21, 1959 |